(12) United States Patent
Endoh

(10) Patent No.: US 8,633,664 B2
(45) Date of Patent: Jan. 21, 2014

(54) MOTOR CONTROL APPARATUS

(75) Inventor: Go Endoh, Obu (JP)

(73) Assignee: Denso Corporation, Kariya (JP)

( * ) Notice: Subject to any disclaimer, the term of this patent is extended or adjusted under 35 U.S.C. 154(b) by 218 days.

(21) Appl. No.: 13/080,929

(22) Filed: Apr. 6, 2011

(65) Prior Publication Data

US 2011/0248657 A1 Oct. 13, 2011

(30) Foreign Application Priority Data

Apr. 7, 2010 (JP) ................................. 2010-088672

(51) Int. Cl.
*H02H 7/09* (2006.01)

(52) U.S. Cl.
USPC ............ 318/400.22; 318/400.21; 318/400.27; 318/434

(58) Field of Classification Search
USPC ............ 318/400.21, 400.22, 400.26, 400.27, 318/400.29, 434
See application file for complete search history.

(56) References Cited

U.S. PATENT DOCUMENTS

| | | | |
|---|---|---|---|
| 5,644,202 A * | 7/1997 | Toriyama et al. | 318/369 |
| 6,967,454 B1 * | 11/2005 | Braun | 318/565 |
| 8,154,241 B2 * | 4/2012 | Suzuki | 318/802 |
| 8,232,752 B2 * | 7/2012 | Kezobo et al. | 318/400.06 |
| 8,248,010 B2 * | 8/2012 | Mukai et al. | 318/400.21 |
| 8,310,196 B2 * | 11/2012 | Ams | 318/798 |
| 8,319,460 B2 * | 11/2012 | Son et al. | 318/400.11 |
| 8,339,080 B2 * | 12/2012 | Suzuki | 318/400.26 |
| 8,410,745 B2 * | 4/2013 | Hosoda et al. | 318/801 |
| 2004/0027083 A1 | 2/2004 | Suzuki | |
| 2010/0036555 A1 * | 2/2010 | Hosoda et al. | 701/22 |
| 2010/0060222 A1 * | 3/2010 | Kezobo et al. | 318/490 |
| 2010/0263953 A1 * | 10/2010 | Shimana | 180/65.285 |
| 2011/0156626 A1 * | 6/2011 | Mukai et al. | 318/400.21 |
| 2011/0273122 A1 * | 11/2011 | Murata et al. | 318/400.22 |

FOREIGN PATENT DOCUMENTS

| | | |
|---|---|---|
| JP | 2003-324985 | 11/2003 |
| JP | P2006-158182 A | 6/2006 |

OTHER PUBLICATIONS

Japanese Office Action dated Mar. 23, 2012, issued in corresponding Japanese Application No. 2010-088672, with English translation.

* cited by examiner

*Primary Examiner* — Bentsu Ro
*Assistant Examiner* — Thai Dinh
(74) *Attorney, Agent, or Firm* — Nixon & Vanderhye P.C.

(57) ABSTRACT

An inverter circuit is provided for a plurality of coils and includes switching elements forming switching element pairs in correspondence to each phase of the coils. Current detection sensors detect currents flowing low-side FETs, respectively. A control circuit has a failure detection section, which detects arm short-circuit failure of the element pairs based on current values detected by the current detection sensors at timing when one or the other of all the low-side FETs and all the high-side FETs are turned on and turned off, respectively.

6 Claims, 9 Drawing Sheets

FIG. 9  COMPARATIVE EXAMPLE
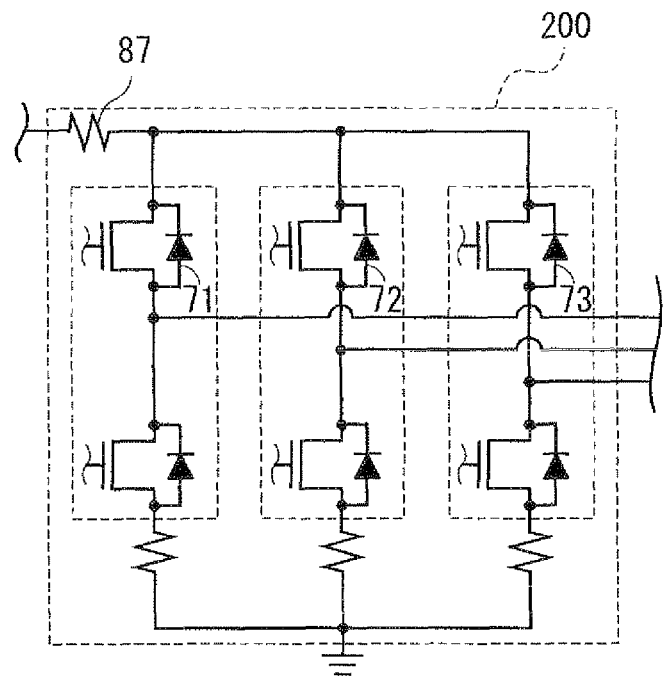

MOTOR CONTROL APPARATUS

CROSS REFERENCE TO RELATED APPLICATION

This application relates to and incorporates herein by reference Japanese patent application No. 2010-088672 filed on Apr. 7, 2010.

FIELD OF THE INVENTION

The present invention relates to a motor control apparatus.

BACKGROUND OF THE INVENTION

A conventional motor control apparatus controls a motor, which has phase windings of a plurality of phases. This motor control apparatus controls rotation of a motor by controlling on/off of high-side FETs (field effect transistors) and low-side FETs in a plurality of phases of an inverter circuit. Safety design is implemented in both aspects of hardware and software so that a failure, in which both a high-side FET and a low-side FET of a predetermined phase are short-circuited at the same time, does not arise. This failure is referred to as an arm short-circuit failure of a predetermined phase. If safety design against the arm short-circuit failure is not implemented, large current continues to flow to the inverter circuit. It is likely that this will cause burn-out of the inverter circuit in the end.

According to a motor control apparatus for an electric power steering system of a vehicle disclosed in the following patent document 1, rotation of the motor is controlled by controlling on/off state of high-side FETs and low-side FETs in three phases of an inverter circuit. In this motor control apparatus, a shunt resistor is provided between each of the low-side FETs and the ground. Current flowing in the shunt resistor is detected by detecting a voltage difference across the shunt resistor, amplifying the voltage difference and converting the amplified voltage difference to current. A current value acquired when all the low-side FETs of all three phases are turned on is set as a first current value. A current value acquired when all the low-side FETs of all three phases are turned off is set as a second current value. The first current value is corrected by the second current value, which is used as an offset correction value. Short-circuit failure in the high-side FET and the low-side FET is detected by comparing a third current value, which is the corrected first current value, with a threshold value. According to a motor control apparatus for an electric power steering system disclosed in the following patent document 2, short-circuit of either FET is detected by comparing a second current value, which is detected when low-side FETs of all three phases are turned off, with a threshold value.

Patent document 1: JP 2003-324985A
Patent document 2: JP 2003-324928A (US 2004/0027083 A1)

Even if safety design is exercised in an inverter circuit, it is still likely that unexpected secondary failure will be caused as a chain reaction by one other failure or an arm short-circuit failure will be caused by an uncontrollable operation of a CPU or the like. According to the method disclosed in patent document 1, when either the high-side FET or the low-side FET in three phases is short-circuited, the third current value exceeds the predetermined value. It is thus possible to determine short-circuit abnormality. However, if both the high-side FET and the low-side FET of the same phase are short-circuited at the same time, the third current value, which is corrected, does not exceed the threshold value. It is therefore likely that the arm short-circuit failure cannot be detected.

According to the method disclosed in the patent document 2, whether one of or both of the high-side FET and the low-side FET of the same phase is short-circuited, the same result is detected. For this reason, it is not possible to differentiate the short-circuit failure of the high-side FET, the short-circuit failure of the low-side FET and the arm short-circuit failure, in which both the high-side FET and the low-side FET of the same phase are short-circuited. It is not possible to shorten detection time only for the arm short-circuit failure.

If the arm short-circuit failure arises, battery voltage falls. It is therefore possible to detect the arm short-circuit failure by monitoring fall of the power supply voltage of the inverter circuit. Possibility of erroneous detection may rise, because the voltage falls due to a plurality of reasons other than the arm short-circuit failure. The other reasons include fall of voltage due to overload on other electric devices. Even in case of the arm short-circuit failure, voltage falling due to wiring resistance between the battery and an electronic control unit (ECU) changes. Further, it takes time for a central processing unit (CPU) to recognize fall of the voltage, because the voltage actually falls only after the current is drawn from an aluminum electrolytic capacitor provided between the inverter circuit and the battery and a low-pass filter (LPF) is provided as hardware for analog/digital (A/D) conversion of voltage.

SUMMARY OF THE INVENTION

The present invention addresses the above-described problem. It is an object of the present invention to provide a motor control apparatus, which is capable of detecting distinguishably short-circuit failure of a high-side FET, short-circuit failure of a low-side FET and arm short-circuit failure of an inverter circuit and shortening time for detecting the arm short-circuit failure.

It is another object of the present invention to provide a motor control apparatus, which is capable of providing failure analysis information for use in case of future failure by specifying in detail a failing part.

According to the present invention, a motor control apparatus is provided for a motor having phase windings in correspondence to a plurality of phases. The motor control apparatus comprises an inverter circuit, a power supply on/off switching circuit, a current detection sensor and a control circuit. The inverter circuit supplies current to the windings and has a plurality of switching elements forming an element pair of a high-side switching element and a low-side switching element for each phase of the windings. The high-side switching element is provided at a high potential side and the low-side switching element is provided at a low potential side. The power supply on/off switching circuit switches over on/off state of the switching element. The current detection sensor detects current flowing in the low-side switching element and is connected to the low-side switching element at a position opposite to the high-side switching element. The control circuit controls the power supply on/off switching circuit and includes a failure detection section for detecting failure of the element pair based on current values detected by the current detection sensors at timing when one of the high-side switching elements and the low-side switching elements are all turned off and the other of the high-side switching elements and the low-side switching elements are all turned on. The failure detection section is configured to compare a first current value and a second current value of a predetermined phase with a threshold value, and determine that both of the high-side switching element and the low-side switching element in the predetermined phase have short-circuit failure when both the first current value and the second current value are greater than the threshold value. The first current value is detected by the current detection sensor when all the high-side switching elements are turned off and all the low-side switching elements are turned on. The second current value is detected by the current detection sensor when all the high-side switching elements are turned on and all the low-side switching elements are turned off

BRIEF DESCRIPTION OF THE DRAWINGS

The above and other objects, features and advantages of the present invention will become more apparent from the following detailed description made with reference to the accompanying drawings. In the drawings:

FIG. 9 is a circuit diagram showing a motor control apparatus according to a comparative example of the present invention.

DETAILED DESCRIPTION OF THE PREFERRED EMBODIMENT

Figure 1:
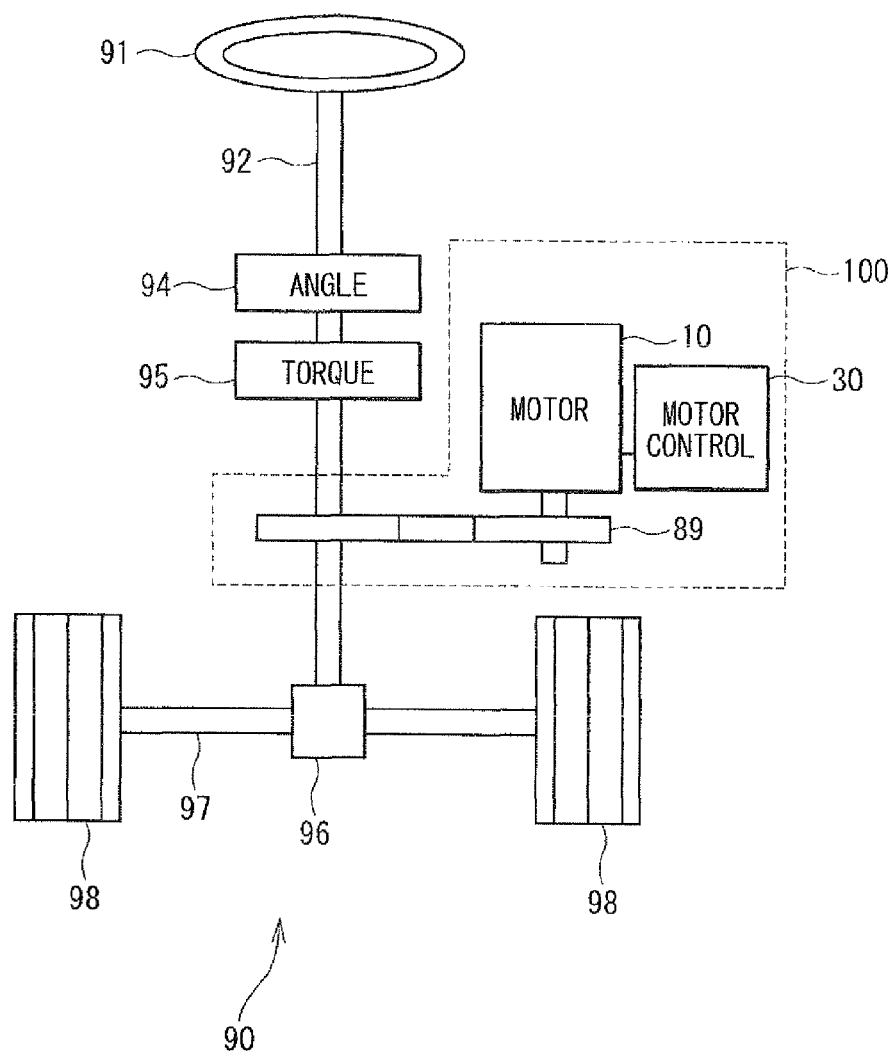
FIG. 1 is a schematic diagram showing an electric power steering system, which use a motor control apparatus according to a first embodiment of the present invention.

The present invention will be described in detail with respect to a plurality of embodiments shown in the drawings.

First Embodiment

As shown in FIG. 1, a motor control apparatus according to a first embodiment of the present invention is applied to an electric power steering system 100 of a power steering system 90, for example, which assists steering operation of a vehicle.

In the electric power steering system 100, a steering wheel 91 is fixed to a steering shaft 92. A steering angle sensor 94 and a torque sensor 95 are provided on the steering shaft 92. The steering angle sensor 94 detects steered rotation angle of the steering shaft 92. The torque sensor 95 detects steering toque applied to the steering wheel 91. A top end of the steering shaft 92 is coupled to a rack shaft 97 through a gear set 96. A pair of tires (wheels) 98 is coupled to both ends of the rack shaft 97 through a tie rod and the like. Rotary motion of the steering shaft 92 is translated into a linear motion of the rack shaft 97 by the gear set 96. The tires 98 at the left side and the right side are steered by an angle corresponding to a change in the linear motion of the rack shaft 97.

The electric power steering system 100 is configured with an electric motor 10, which generates steering assisting torque, a motor control apparatus 30, which controls the motor 10, a rotation angle sensor (not shown), which detects rotational angle of the motor 10, and a gear set 89, which transfers rotation of the motor 10 to the steering shaft 92 after reduction of rotation speed. The motor 10 may be a three-phase brushless motor, for example, which rotates the gear set 89 in forward and reverse directions. The electric power steering system 100 transfers the steering assisting torque, which corresponds to direction and torque of steering operation of a vehicle driver on the steering wheel 91.

Figure 2:
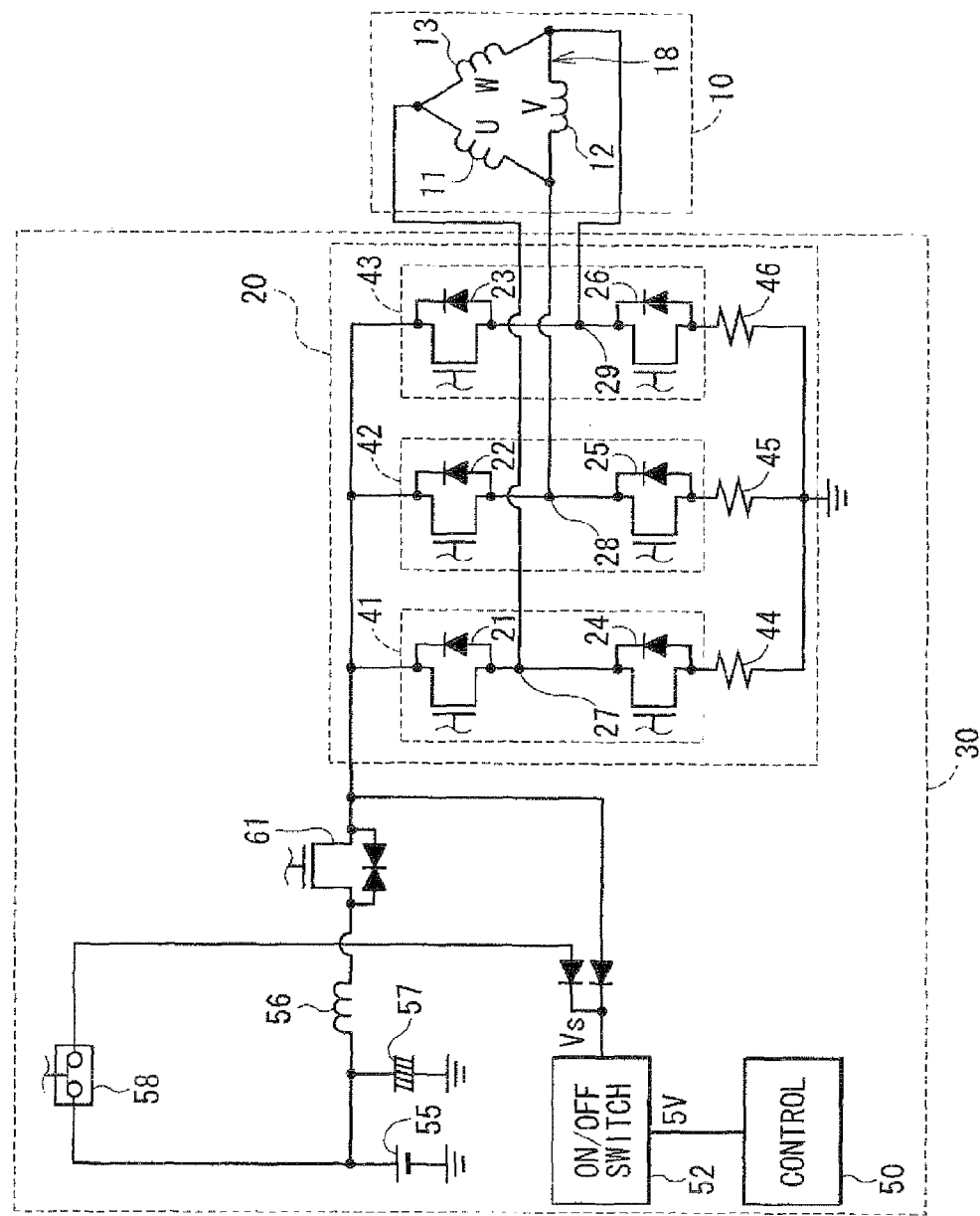
FIG. 2 is a circuit diagram showing the motor control apparatus according to the first embodiment of the present invention.

The motor 10 has a stator, a rotor and a shaft, which are not shown. The rotor is a disk-shaped body, which is rotatable with the shaft and has permanent magnets on its surface for providing magnetic poles. The stator surrounds the rotor and supports the rotor ratatably therein. The stator has protrusions at a predetermined angular interval in a circumferential direction. Each protrusion protrudes inward in a radial direction. A U-coil 11, a V-coil 12 and a W-coil 13, which are phase windings shown in FIG. 2, are wound about the protrusions. The U-coil 11, the V-coil 12 and the W-coil 13 are connected in a Δ-shape for example to form a winding set 18. Although the winding set 18 is in the Δ-shape in the first embodiment, it may be connected in a Y-shape. The coils 11 to 13 are windings in the winding set 18. A rotation angle sensor is provided inside the motor 10 to detect rotational position θ of the rotor. The rotation angle sensor is a resolver. It is also possible to estimate a rotational angle of the rotor based on each phase voltage and current in place of using the rotation angle sensor.

Circuit configuration of the motor control apparatus 30 is described next with reference to FIG. 2. The motor control apparatus 30 for controlling the motor 10 is configured with an inverter circuit 20, a control circuit 50, a power supply on/off switching circuit 52 and the like.

The inverter circuit 20 is a three-phase inverter, in which six switching elements 21 to 26 are connected in a bridge form thereby to switch on and off current supply to each of the U-coil 11, V-coil 12 and W-coil 13 of the winding set 18. Each switching element 21 to 26 is a metal-oxide-semiconductor field-effect transistor (MOSFET). The switching elements 21 to 26 are referred to as FETs 21 to 26.

The FETs 21 to 23 are connected to a power supply side (high voltage side) through respective drains. Sources of the FETs 21 to 23 are connected to drains of FETs 24 to 26, respectively. Sources of the FETs 24 to 26 are connected to a ground side (low potential side). A U-junction 27 between the FET 21 and the FET 24, which are connected in series and paired, is connected to one end of the U-coil 11. A V-junction 28 between the FET 22 and the FET 25, which are connected in series and paired, is connected to one end of the V-coil 12. A W-junction 27 between the FET 23 and the FET 26, which are connected in series and paired, is connected to one end of the W-coil 13.

The FETs 21 to 23 connected to the power supply side are high potential side switching elements (high-side FETs). The FETs 24 to 26 connected to the ground side are low potential side switching elements (low-side FETs). The FETs 21 and 24 form a U-switching element pair 41. The FETs 22 and 25 form a V-switching element pair 42. The FETs 23 and 26 form a W-switching element pair 43. Each element pair 41, 42, 43 form an arm.

As shown in FIG. 2, the inverter circuit 20 includes current detection sensors 44, 45 and 46. The current detection sensors 44, 45 and 46 are formed of, for example, shunt resistors. The current detection sensors 44, 45 and 46 are connected to the low-side FETs 24, 25 and 26 and disposed at positions opposite to the high-side FETs 21, 21 and 23, that is, junctions 27, 28 and 29, respectively. For example, the current detection sensor 44 is provided between the low-side FET 24 and the ground. The current detection sensor 45 is provided between the low-side FET 25 and the ground. The current detection sensor 46 is provided between the low-side FET 26 and the ground. Current detection values outputted by the current detection sensors 44, 45 and 46 as voltage values are stored in a register (not shown) forming a part of the control circuit 50. All three current values of the current detection sensors 44, 45 and 46 are acquired at the same time by the control circuit 50.

The inverter circuit 20 is supplied with electric power from a battery 55, which is a power source. A radio noise coil 56 and a power smoothing capacitor 57 are provided between the battery 55 and the inverter circuit 20. The radio noise coil 56 and the power smoothing capacitor 57 forms a filter circuit. This filter circuit suppresses noises, which are generated by the inverter circuit 20 in its power switching operation, from being transmitted to other electronic component parts, which are also supplied with electric power from the same battery 55.

An ignition switch 58 is connected to the battery 55. With the ignition switch 58 being turned on, the control circuit 50 performs failure detection processing, rotation control processing and the like.

A power supply relay 61 is provided between the inverter circuit 20 and the battery 55 and the filter circuit. The power supply relay 61 is provided to instantly interrupt power supply from the battery 55 to the inverter circuit 20, when abnormality arises in the inverter circuit 20, the on/off switching circuit 52 and the like.

The control circuit 50 is configured to control entire operation of the motor control apparatus 30 and generally is formed of a microcomputer. Control lines from the control circuit 50 are not shown for simplicity. The control circuit 50 controls current supplied to the coils 11 to 13 by controlling the on/off state of the FETs 21 to 26 by way of the on/off switching circuit 52. The control circuit 50 is configured to perform the failure detection processing, which detects failure in the switching element pairs in the inverter circuit 20.

On/off control for the FETs 21 to 26 by the control circuit 50 will be described first prior to the failure detection processing. For example, on/off switching timing of the FETs 21 to 26 is controlled by comparing a duty command signal with a PWM reference signal P shown in FIG. 3A. The duty command signal is calculated and generated by a PWM signal generation circuit, which is not shown but forms a part of the control circuit 50. This control is referred to as PWM control.

Figure 3A:
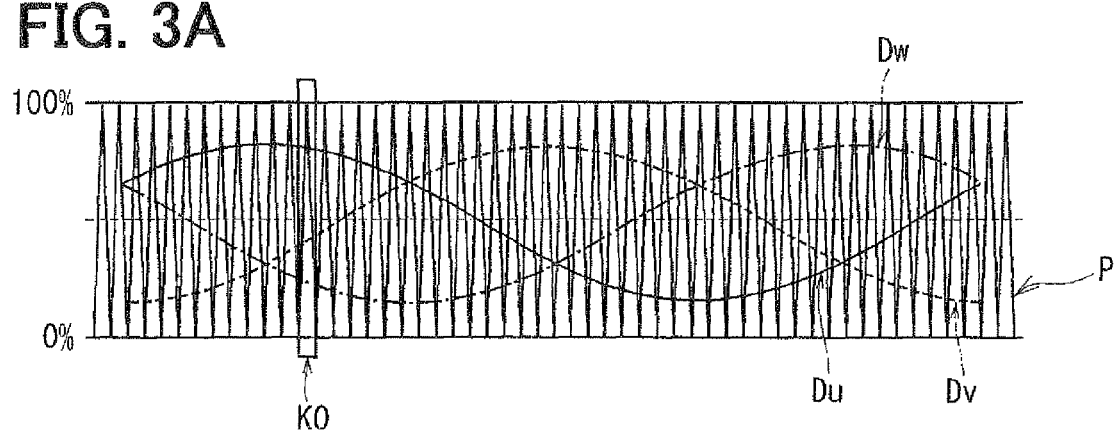
FIGS. 3A and 3B are time charts showing PWM control performed in the first embodiment of the present invention.
Figure 3B:
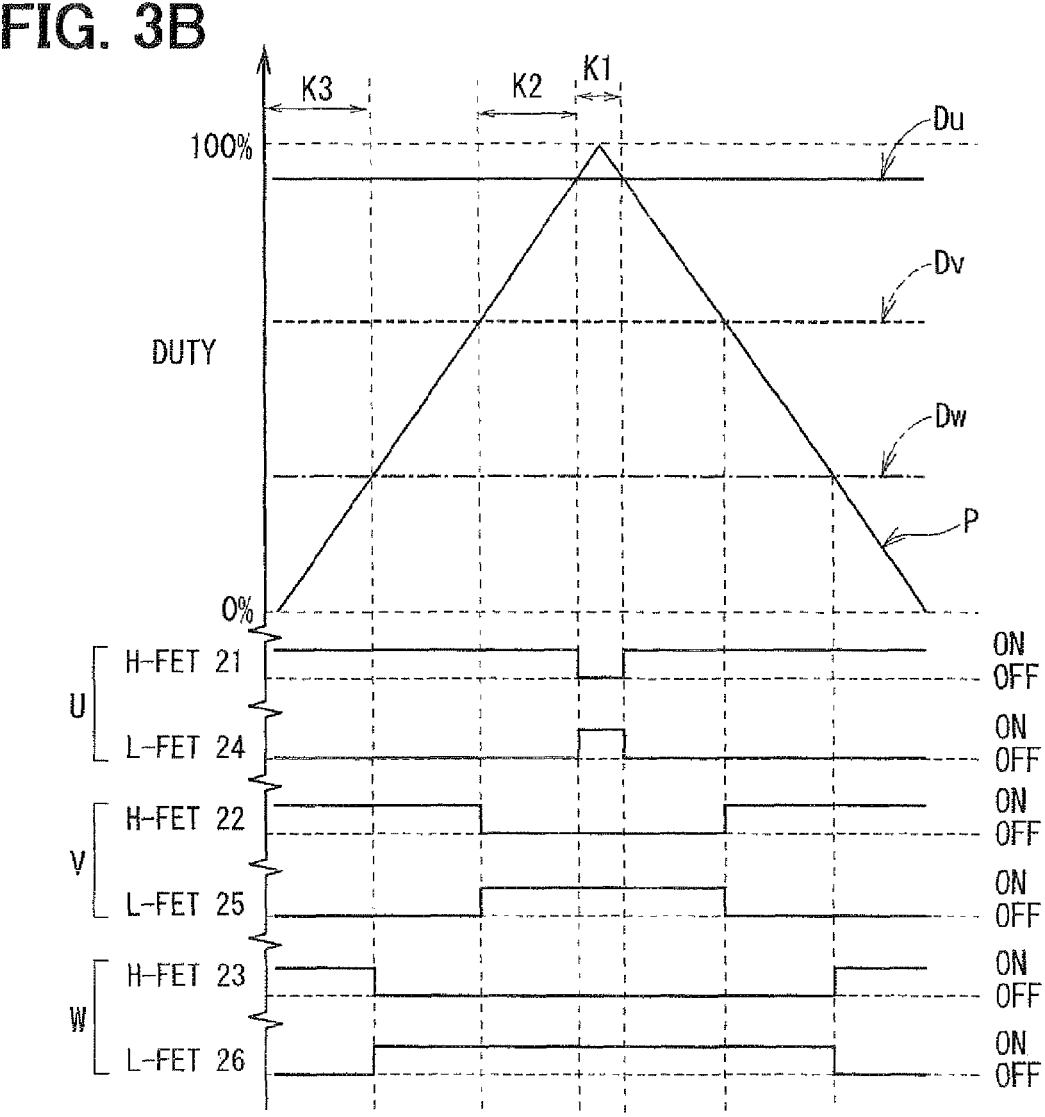

In PWM control, the control circuit 50 controls the on/off state of the FETs 21 to 26 by comparing the duty command signals and the PWM reference signal P, which is a triangular wave, as shown in FIG. 3A. The duty command signals have U-phase duty Du, V-phase duty Dv and W-phase duty Dw. FIG. 3B shows a period (time section) K0 in FIG. 3A in enlarged manner.

In the first embodiment, during a period in which the PWM reference signal P exceeds the duty command signal of each phase (for example U-phase), a corresponding high-side FET (for example FET 21) among the FETs 21 to 23 is turned off. During a period in which the PWM reference signal P does not exceed the duty command signal of each phase (for example U-phase), a corresponding high-side FET (for example FET 21) among the FETs 21 to 23 is turned on. The low-side FETs 24 to 26, which are paired with the high-side FETs 21 to 23, are turned to the on- or off-state, which is opposite to the on/off state of the corresponding high-side FETs 21 to 23. That is, during a period in which the PWM reference signal P exceeds the duty command signal of each phase, a corresponding low-side FET among the FETs 21 to 23 is turned on. During a period in which the PWM reference signal P does not exceed the duty command signal of each phase, a corresponding low-side FET among FETs 24 to 26 is turned off.

Specifically, as shown in FIG. 3B, the PWM reference signal P is higher than the U-phase duty Du, the V-phase duty Dv and the W-phase duty Dw in a period K1. Therefore, the high-side FET 21 turns off and the low-side FET 24 turns on with respect to the U-phase. The high-side FET 22 turns off and the low-side FET 25 turns on with respect to the V-phase. The high-side FET 23 turns off and the low-side FET 26 turns on with respect to the W-phase.

Figure 4A:
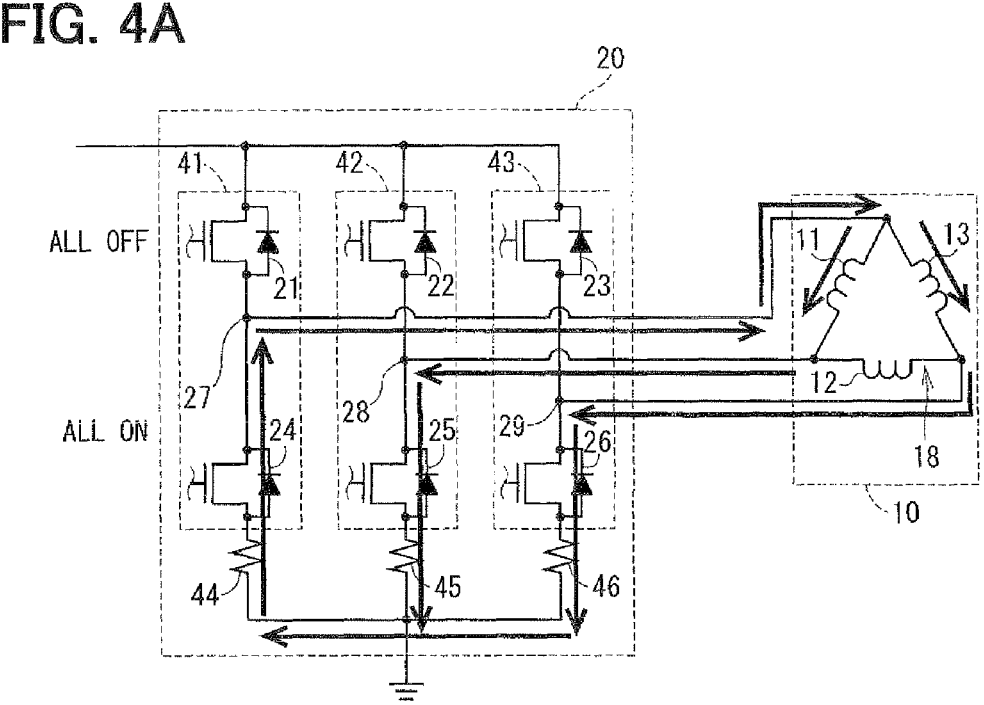
FIGS. 4A and 4B are circuit diagrams showing a case, in which no failure arises in the first embodiment of the present invention.

As shown in FIG. 4A, the high-side FETs 21, 22 and 23 turn off and are non-conductive under normal operation (no abnormality). The current continues to flow in the low-side FETs 24, 25, 26 and the winding set 18 due to L and R components of the motor 19, from FET 24 to FETs 25, 26 via set 18 in case of K1. It is assumed that the current value detected as the voltage across the shunt resistor by the current detection sensor 44 is assumed to be a first current value I1, the current value detected by the current detection sensor 45 is a first current value I2, and the current value detected by the current detection sensor 46 is a first current value I3. Further, for example, the direction of current is positive when it flows from the low-side FETs 24, 25 and 26 towards the current detection sensors 44, 45 and 46 and the direction of current is negative when it flows from the current detection sensors 44, 45 and 46 to the low-side FETs 24, 25 and 26. Here, I1<0, I2>0 and I3>0.

As shown in FIG. 3A, the PWM reference signal P is lower than the U-phase duty Du, the V-phase duty Dv and the W-phase duty Dw in a period K3. Therefore, the high-side FET 21 turns on and the low-side FET 24 turns off with respect to the U-phase. The high-side FET 22 turns on and the low-side FET 25 turns off with respect to the V-phase. The high-side FET 23 turns on and the low-side FET 26 turns off with respect to the W-phase.

Figure 4B:
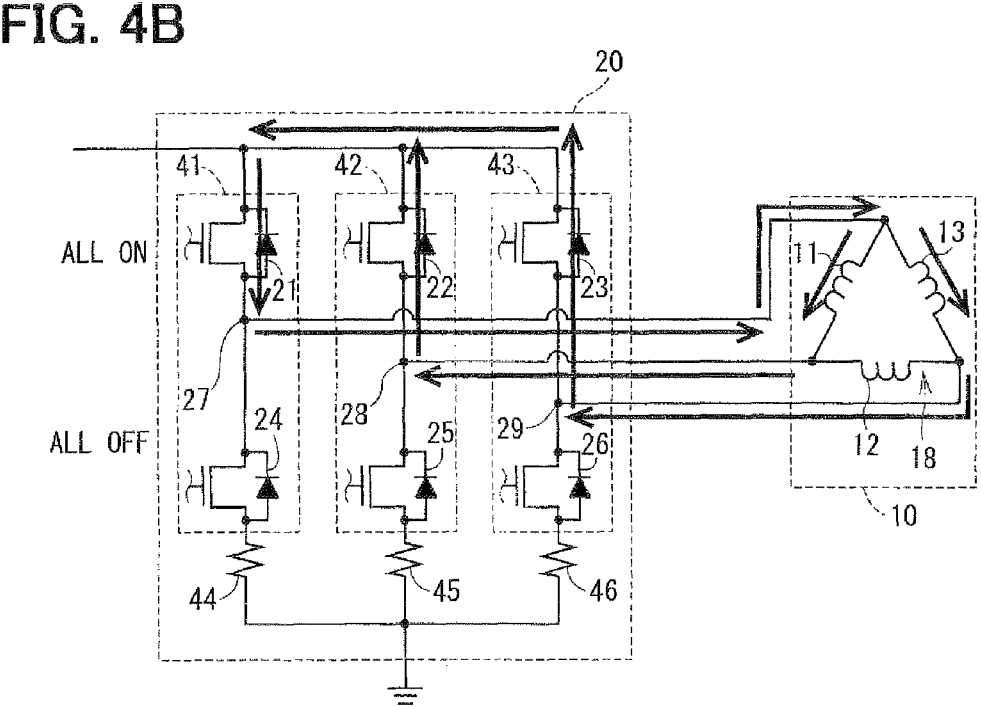

As shown in FIG. 4B, the low-side FETs 24, 25 and 26 turn off and are non-conductive under normal operation. As a result, the current supplied from the power source flows in the high-side FETs 21, 22, 23 and the winding set 18. It is assumed here that the current value detected by the current detection sensor 44 is a second current value I4, the current value detected by the current detection sensor 45 is a second current value I5, and the current value detected by the current detection sensor 46 is a second current value I6.

Figure 5:
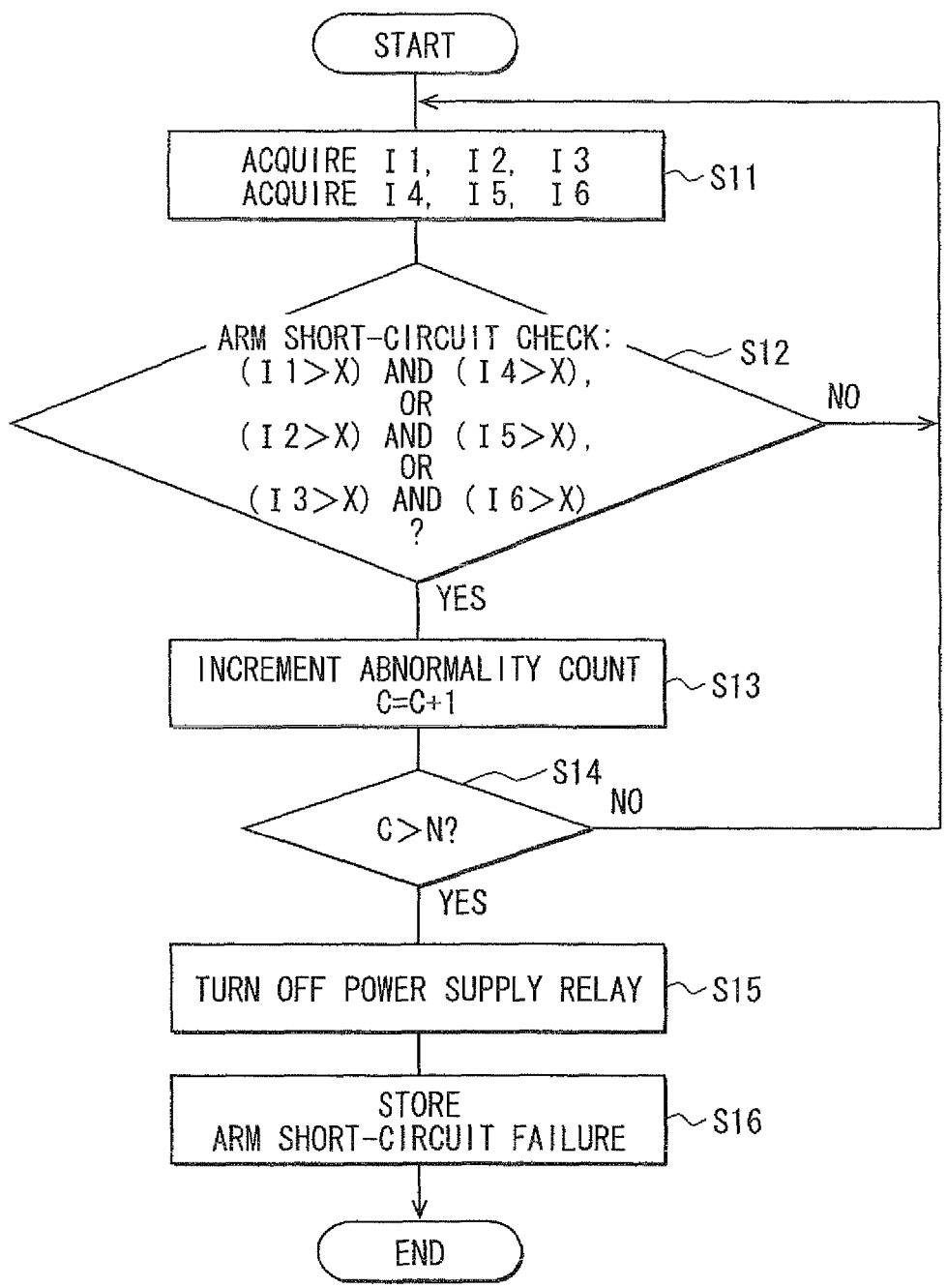
FIG. 5 is a flowchart showing failure processing performed in the first embodiment of the present invention.

The failure detection processing performed by the control circuit 50 will be described next with reference to a flowchart shown in FIG. 5. As shown in FIG. 5, at step S11 ("step" is indicated by only "S" hereinunder), the current values are acquired from the current detection sensors 44, 45 and 46 at timing when all the high-side FETs 21, 22 and 23 are turned off at the same time and all the low-side FETs 24, 25 and 26 are turned on at the same time. The current values acquired at this time are referred to as the first current values I1, I2 and I3, respectively. The current values are acquired by the current detection sensors 44, 45 and 46 at timing when all the high-side FETs 21, 22 and 23 are turned on at the same time and all the low-side FETs 24, 25 and 26 are turned off at the same time. The current values acquired at this time are referred to as the second current values I1, I2 and I3, respectively.

It is checked at S12 (arm short-circuit check) whether at least one of three (first, second and third) predetermined conditions is satisfied. The first condition is a combination of I1>X and I4>X. The second condition is a combination of I2>X and I5>X. The third condition is a combination of I3>X and I6>X. Here, X is a threshold value, which is a positive integer. This threshold value X is set to be greater than a maximum value of current, which flows in the low-side FETs 24, 25 and 26 under the normal operation, and less than a value of current, which flows in the low-side FETs 24, 25 and 26 under the arm short-circuit condition.

If at least one of the first condition, that is, I1>X and I4>X, the second condition, that is, I2>X and I5>X, and the third condition, that is, I3>X and I6>X, is satisfied (S12: YES), it is suspected that the element pair 41, the element pair 42 or the element pair 43 has arm short-circuit failure. In this instance, S13 is executed. If none of the first condition to the third condition is satisfied, S11 and S12 are repeated.

Figure 6A:
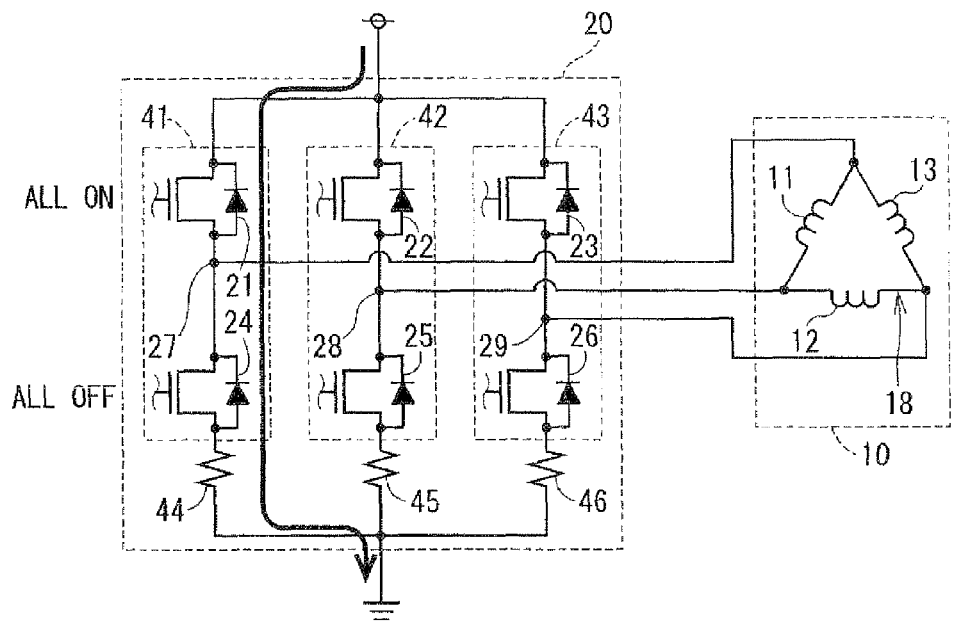
FIGS. 6A and 6B are circuit diagrams showing a case, in which arm short-circuit arises in the first embodiment of the present invention.
Figure 6B:
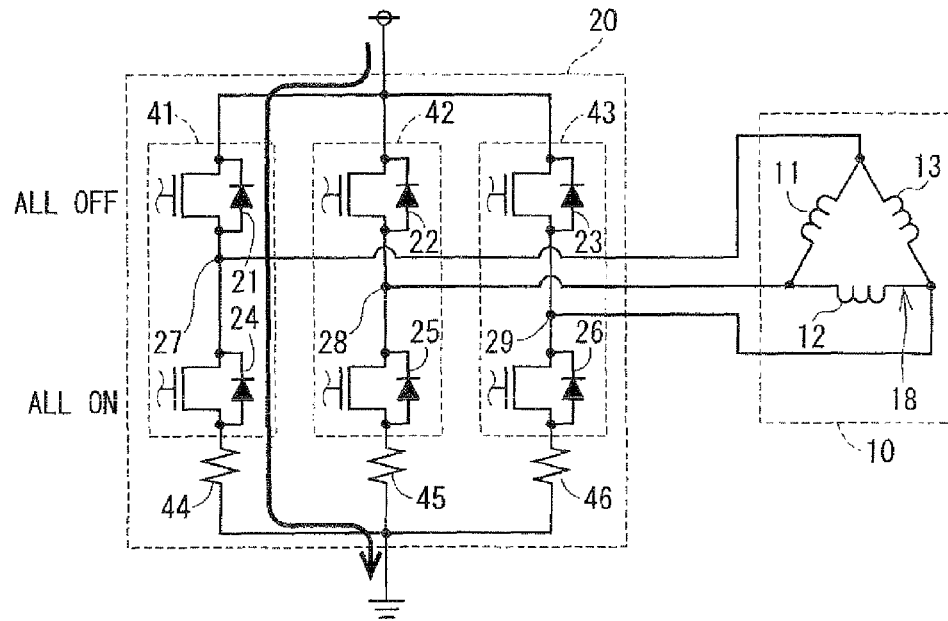

If the U-switching element pair 41 has arm short-circuit, for example, through-current flows in the low-side FET 24 when all the high-side FETs 21, 22 and 23 are turned on and all the low-side FETs 24, 25 and 26 are turned off as shown in FIG. 6A. The through-current also flows in the low-side FET 24 even when all the high-side FETs 21, 22 and 23 are turned off and all the low-side FETs 24, 25 and 26 are turned on as shown in FIG. 6B. As a result, the first current value I1, which is detected by the current detection sensor 44 when all the low-side FETs 24, 25 and 26 are turned off at the same time, and the second current value I4, which is detected by the current detection sensor 44 when all the low-side FETs 24, 25 and 26 are turned on at the same time, are both greater than X. Therefore, the first condition, which is I1>X and I4>X, is satisfied, and S13 is executed next.

At S13, an abnormality counter of a failing phase, which corresponds to the element pair 41, 42 or 43 and is suspected of having arm short-circuit failure, is incremented. That is, a count C of such an abnormality counter of the failing phase, in which failure arose, is incremented (C=C+1). Then, it is checked at S14 whether the count C of the abnormality counter of each phase (arm) is equal to or greater than a predetermined number N. Here, N is a natural number greater than 0. If it is determined that the count C is not equal to or greater than the predetermined number N (S14: NO), S11 to S14 are repeated. If it is determined that the count C is equal to or grater than the predetermined number (S14: YES), S15 is executed.

At S15, the power supply relay 61 is turned off to interrupt current from flowing to the inverter circuit 20. At S16, arm short-circuit failure of a failing phase is stored.

According to the first embodiment, arm short-circuit failure is detected by the first current values I1, I2 and I3 and the second current values I4, I5 and I6. The first current values I1, I2 and I3 are detected by the current detection sensors 44, 45 and 46, respectively, when all the high-side FETs 21, 22 and 23 are turned off at the same time and all the low-side FETs 24, 25 and 26 are turned on at the same time. The second current values I4, I5 and I6 are detected by the current detection sensors 44, 45 and 46 when all the high-side FETs 21, 22 and 23 are turned on at the same time and all the low-side FETs 24, 25 and 26 are turned off at the same time. The arm short-circuit failure is determined with respect to each phase, if at least one of the first condition, I1>X and I4>X, the second condition, I2>X and I5>X, and the third condition, I3>X and I6>X, is satisfied.

It is noted that checking and determining arm short-circuit failure may be performed by different processing other than that shown in FIG. 5. For example, it may be possible to detect the arm short-circuit failure by detecting fall of the battery voltage, based on a phenomenon that the battery voltage will fall when the arm short-circuit failure arises. However, the battery voltage also falls due to other causes than the arm short-circuit failure. Such other causes may be electric overload on other electric parts. It is therefore not possible to detect only the arm short-circuit failure within a short period by detecting fall of the power supply voltage of the inverter circuit 20. According to the first embodiment, however, it is possible to detect only the arm short-circuit instantly and prevent surely the inverter circuit 20 from burning out due to excessive current. As a result, it is possible to minimize influence of the rapid fall of battery voltage, which will be caused by continuous flow of the excessive current, to other electric systems of a vehicle.

It may also be possible to provide, as shown in FIG. 9 as a comparative example, one shunt resistor 87 at an upstream side of high-side FETs 71, 72 and 73 of three phases of an inverter circuit 200. Arm short-circuit can be detected by comparing a current value of the shunt resistor 87 with a predetermined threshold value. If the current flowing in the shunt resistor 87 is greater than the predetermined threshold value, it is possible to determine that the inverter circuit 200 has arm short-circuit failure. It is however not possible to detect which phase of the inverter circuit 200 has the arm short-circuit failure. According to the first embodiment, however, it is possible to determine a specific phase, which has the arm short-circuit failure, and store the determined failing phase at the time of detecting the arm short-circuit failure. Since location (phase or arm) of the arm short-circuit failure can be specifically determined, useful information for failure analysis can be provided when arm short-circuit failure arises.

According to the first embodiment, the arm short-circuit failure can be detected without using a new current detection sensor (for example, shunt resistor 87 shown in FIG. 9), which adds costs. Thus it is effective to suppress additional cost of the control apparatus.

Second Embodiment

An electric power steering system 100 and a motor control apparatus 30 according to a second embodiment of the present invention have the similar hardware and software configuration as the first embodiment. The motor control apparatus 30 according to the second embodiment is configured to further perform high-side failure detection processing in addition to the detection processing (S11 to S16) performed in the first embodiment.

Figure 7:
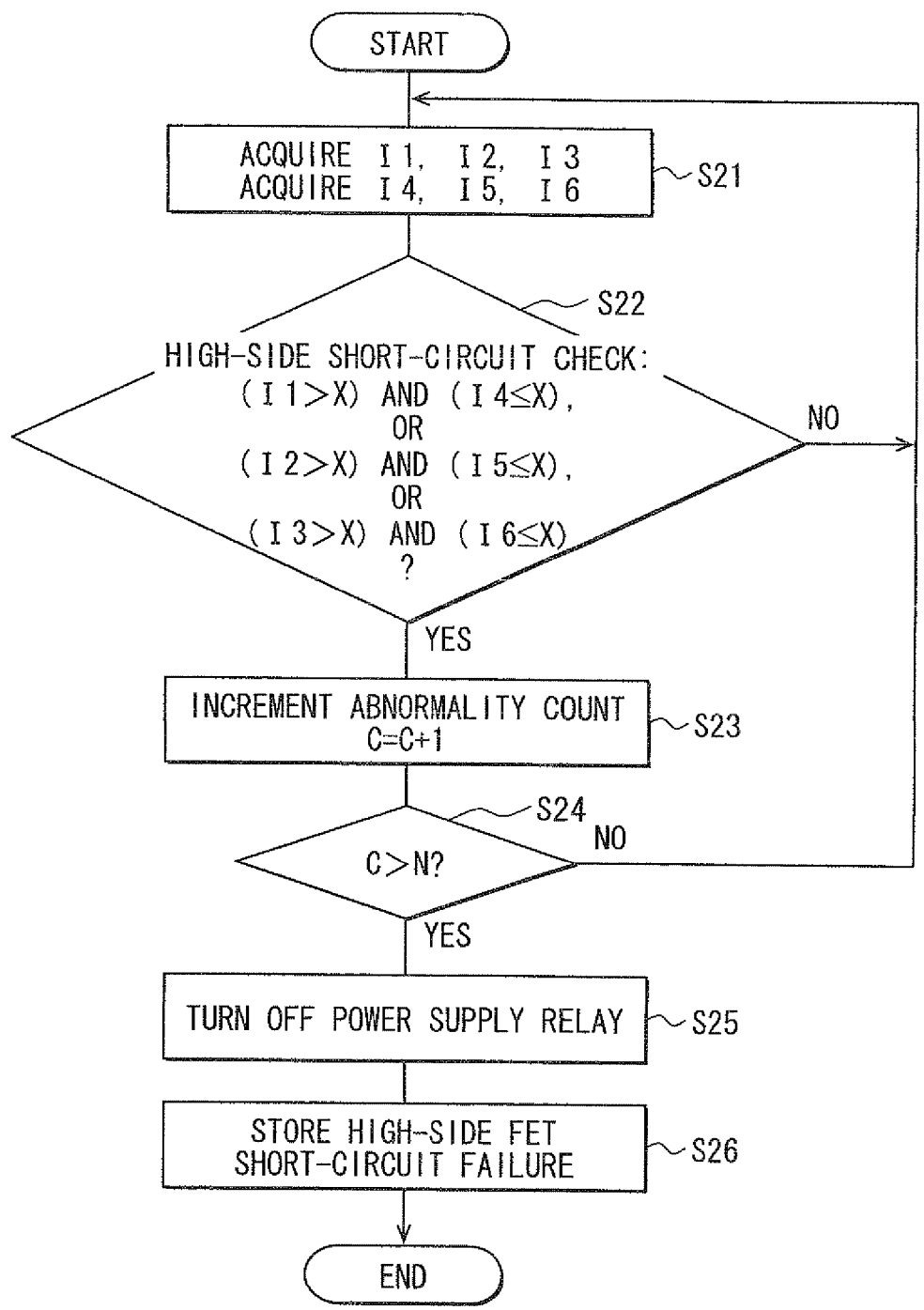
FIG. 7 is a flowchart showing failure processing performed by a motor control apparatus according to a second embodiment of the present invention.

As shown in FIG. 7, at S21, first current values I1, I2 and I3 and second current values I4, I5 and I6 are acquired at the similar timing as in the first embodiment.

It is checked at S22 (high-side short-circuit check) whether at least one of three (fourth to sixth) predetermined conditions is satisfied. The fourth condition is a combination of I1>X and I4≤X. The fifth condition is a combination of I2>X and I5≤X. The sixth condition is a combination of I3>X and I6≤X. If at least one of the fourth condition, the fifth condition and the sixth condition is satisfied (S22: YES), it is suspected that the high-side element 21, the high-side FET 22 or the high-side FET 23 has short-circuit failure. In this instance, S13 is executed. If none of the fourth condition to the sixth condition is satisfied, S21 and S22 are repeated.

If the fourth condition, I1>X and is satisfied, it is suspected that the high-side FET 21 has short-circuit failure. If the fifth condition, I2>X and I5≤X, is satisfied, it is suspected that the high-side FET 22 has short-circuit failure. If the sixth condition, I3>X and I6≤X, is satisfied, it is suspected that the high-side FET 23 has short-circuit failure. At S23, an abnormality counter of a failing phase, which corresponds to the high-side FETs 21, 22 or 23 and is suspected of having short-circuit failure, is incremented. That is, a count C of the abnormality counter of such a failing phase is incremented (C=C+1). Then, S24 is executed. It is checked at S24 whether the count C of the abnormality counter is equal to or greater than a predetermined number N. Here, N is a natural number greater than 0. If it is determined that the count C of the abnormality counter is not equal to or greater than the predetermined number N (S24: NO), S21 to S24 are repeated. If it is determined that the count of the abnormality counter is equal to or greater than the predetermined number (S24: YES), S25 is executed.

At S25, the power supply relay 61 is turned off to interrupt current from flowing to the inverter circuit 20. At S26, short-circuit failure of the high-side FETs 21, 22 or 23 is stored.

According to the second embodiment, the short-circuit failure of any of the high-side FETs 21, 22 and 23 can be detected. When the short-circuit failure of the high-side FET 21, 22 or 23 is detected, current flowing in the inverter circuit 20 is interrupted. Thus secondary failure such as arm short-circuit, which will be caused as a chain reaction by one short-circuit failure, can be suppressed. Since a location of the short-circuit failure can be specifically determined, useful information for failure analysis can be provided when failure arises.

Third Embodiment

An electric power steering system 100 and a motor control apparatus 30 according to a third embodiment of the present invention has the similar hardware and software configuration as the first embodiment. The motor control apparatus 30 according to the third embodiment is configured to further perform low-side short-circuit failure detection processing in addition to the detection processing (S11 to S16) performed in the first embodiment or the detection processing (S11 to S16 and S21 to S26) performed in the second embodiment.

Figure 8:
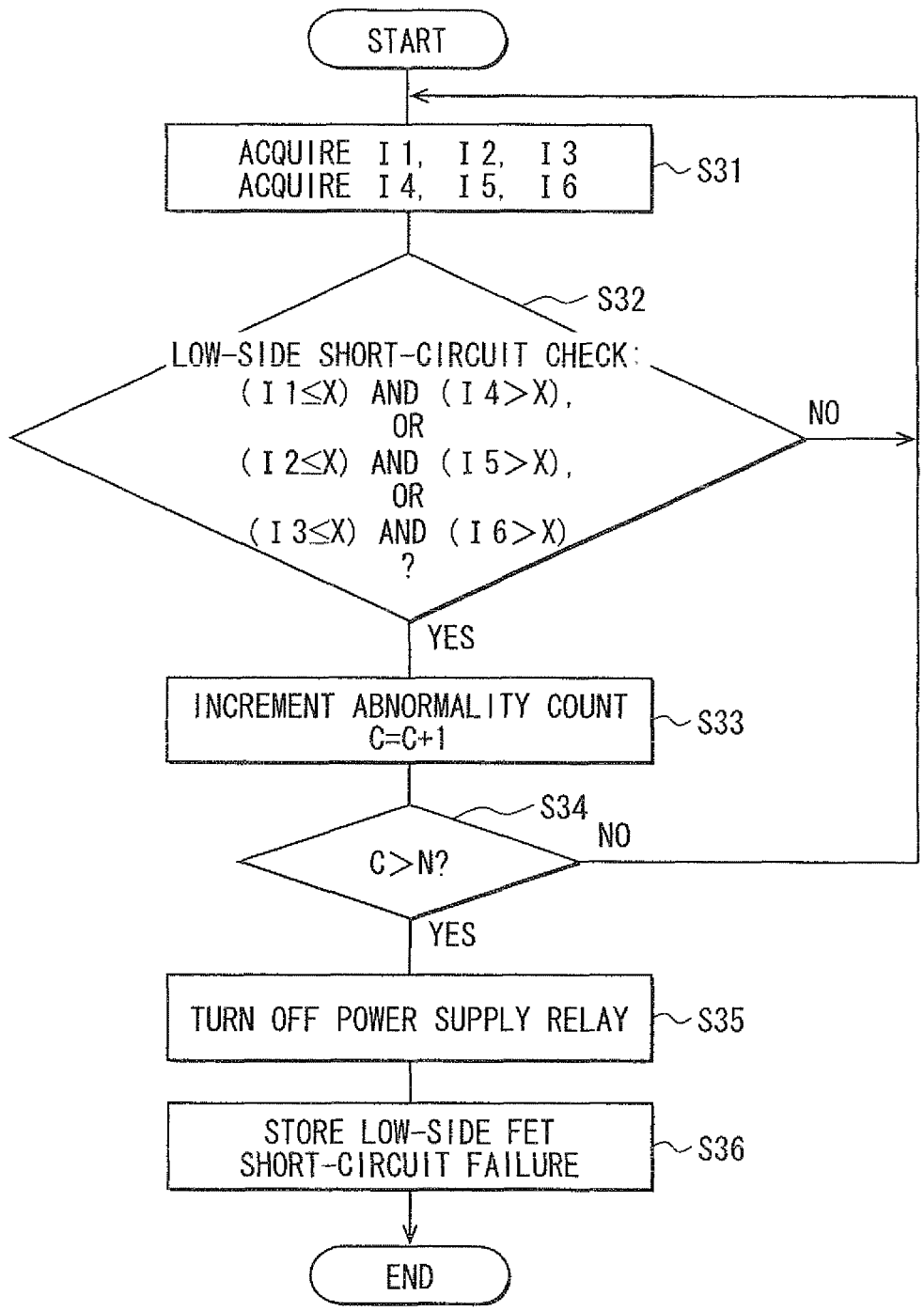
FIG. 8 is a flowchart showing failure processing performed by a motor control apparatus according to a third embodiment of the present invention.

As shown in FIG. 8, at S31, first current values I1, I2 and I3 and second current values I4, I5 and I6 are acquired at the similar timing as in the first embodiment.

It is checked at S32 (low-side short-circuit check) whether at least one of three (seventh, eighth and ninth) predetermined conditions is satisfied. The seventh condition is a combination of I1≤X and I4>X. The eighth condition is a combination of I2≤X and I5>X. The ninth condition is a combination of I3≤X and I6>X. If at least one of the seventh condition, the eighth condition and the ninth condition is satisfied (S32: YES), it is suspected that the low-side FET 24, the low-side FET 25 or the low-side FET 26 has short-circuit failure. In this instance, S33 is executed. If none of the seventh condition to the ninth condition is satisfied, S31 and S32 are repeated.

If the seventh condition, I1≤X and I4>X, are satisfied, it is suspected that the low-side FET 24 has short-circuit failure. If the eighth condition, I2≤X and I5>X, is satisfied, it is suspected that the low-side FET 25 has short-circuit failure. If the ninth condition, I3≤X and I6>X, is satisfied, it is suspected that the low-side FET 26 has short-circuit failure.

At S33, an abnormality counter of a failing phase, which corresponds to the low-side FETs 21, 22, 23 and is suspected of having short-circuit failure, is incremented. That is, a count C of the abnormality counter is incremented (C=C+1). Then, S34 is executed. It is checked at S34 whether the count C of the abnormality counter is equal to or greater than a predetermined number N. If it is determined that the count C of the abnormality counter is not equal to or greater than the predetermined number N (S34: NO), S31 to S34 are repeated. If it is determined that the count C of the abnormality counter is equal to or greater than the predetermined number N (S34: YES), S35 is executed.

At S35, the power supply relay 61 is turned off to interrupt current from flowing to the inverter circuit 20. At S36, short-circuit failure of the low-side FETs 24, 25 or 26 is stored.

According to the third embodiment, the short-circuit failure of the low-side FET 24, 25 or 26 can be detected. When the short-circuit failure of the low-side FET 24, 25 or 26 is detected, current flowing to the inverter circuit 20 is interrupted. Thus secondary failure, which will be caused as a chain reaction by one short-circuit failure, can be suppressed. Since a part of the failure can be specifically determined, useful information for failure analysis can be provided when failure arises.

Other Embodiments

Although three switching element pairs 41, 42 and 43 are provided as bridge arms in the inverter circuit 20 in the foregoing embodiments, two, four or more pairs may be provided. Although only one inverter circuit 20 is provided, two or more inverter circuits may be provided.

Although the short-circuit failure of a corresponding switching element is detected by comparing the first current values and the second current values with the threshold value, the short-circuit failure of a corresponding phase may detected by comparing a difference (third current value) between the first current value and the second current value with another threshold value.

Further, the motor control apparatus is applied in the electric power steering system in the foregoing embodiments. As other embodiments, the motor control apparatus may be applied, without being limited to the electric power steering systems, to other systems such as a primary motor system for a main motor system of a hybrid vehicle and a power window system.

The present invention described above is not limited to the foregoing embodiments and may be implemented in a variety of embodiments.

What is claimed is:

1. A motor control apparatus for a motor having phase windings in correspondence to a plurality of phases, the motor control apparatus comprising:

an inverter circuit for supplying current to the windings, the inverter circuit having a plurality of switching elements forming an element pair of a high-side switching element and a low-side switching element connected in series for each phase of the windings, the high-side switching element being provided at a high potential side and the low-side switching element being provided at a low potential side;

a power supply on/off switching circuit for switching on/off state of the switching element;

a current detection sensor for detecting current flowing in the low-side switching element, the current detection sensor being connected to the low-side switching element at a position opposite to the high-side switching element; and a control circuit for controlling the power supply on/off switching circuit, the control circuit including a failure detection section for detecting failure of the element pair based on current values detected by the current detection sensors at timing when one of the high-side switching elements and the low-side switching elements are all turned off and the other of the high-side switching elements and the low-side switching elements are all turned on, wherein the failure detection section is configured to compare a first current value and a second current value of a predetermined phase with a threshold value, and determine that both of the high-side switching element and the low-side switching element in the predetermined phase have short-circuit failure when both the first current value and the second current value are greater than the threshold value, the first current value being detected by the current detection sensor when all the high-side switching elements are turned off and all the low-side switching elements are turned on, and the second current value being detected by the current detection sensor when all the high-side switching elements are turned on and all the low-side switching elements are turned off.

2. The motor control apparatus according to claim 1, wherein:

the failure detection section is configured to compare the first current value and the second current value of the predetermined phase with the predetermined threshold value, and determine that the high-side switching element of the predetermined phase has the short-circuit failure when the first current value is greater than the threshold value and the second current value is less than the threshold value.

3. The motor control apparatus according to claim 2, wherein: the failure detection section compares the first current value and the second current value of the predetermined phase with the predetermined threshold value, and determine that the low-side switching element of the predetermined phase has the short-circuit failure when the first current value is less than the threshold value and the second current value is greater than the threshold value.

4. The motor control apparatus according to claim 1, wherein:

the failure detection section compares the first current value and the second current value of the predetermined phase with the predetermined threshold value, and determine that the low-side switching element of the predetermined phase has the short-circuit failure when the first current value is less than the threshold value and the second current value is greater than the threshold value.

5. The motor control apparatus according to claim 1, wherein:

the motor is provided in an electric power steering system of a vehicle.

6. The motor control apparatus according to claim 1, wherein:

the failure detection section is configured to detect the failure of the element pair under a state that the control circuit is controlling on/off states of the plurality of switching elements of the inverter circuit for the plurality of phases of the motor by PWM control.

* * * * *